(12) United States Patent
Colenbrander

(10) Patent No.: US 12,274,946 B2
(45) Date of Patent: Apr. 15, 2025

(54) SYSTEMS AND METHODS FOR APPLYING A MODIFICATION MICROSERVICE TO A GAME INSTANCE

(71) Applicant: Sony Interactive Entertainment Inc., Tokyo (JP)

(72) Inventor: Roelof Roderick Colenbrander, Costa Mesa, CA (US)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 436 days.

(21) Appl. No.: 17/961,187

(22) Filed: Oct. 6, 2022

(65) Prior Publication Data

US 2024/0115957 A1    Apr. 11, 2024

(51) Int. Cl.
| A63F 13/77 | (2014.01) |
| A63F 13/355 | (2014.01) |
| A63F 13/73 | (2014.01) |

(52) U.S. Cl.
CPC ............ *A63F 13/77* (2014.09); *A63F 13/355* (2014.09); *A63F 13/73* (2014.09); *A63F 2300/209* (2013.01); *A63F 2300/66* (2013.01)

(58) Field of Classification Search
CPC ............................. A63F 13/77; A63F 13/355
See application file for complete search history.

(56) References Cited

U.S. PATENT DOCUMENTS 11,872,497 B1 *   1/2024   Schuster ................. A63F 13/77
2008/0214253 A1   9/2008   Gillo et al.
(Continued)

FOREIGN PATENT DOCUMENTS

| CN | 111190580 A | 5/2020 |
| CN | 111790159 A | 10/2020 |

OTHER PUBLICATIONS

PCT/US2023/075608 Notification of Transmittal of the International Search Report and the Written Opinion of the International Searching Authority, or the Declaration, PCT/ISA/220, and the International Search Report, PCT/ISA/210, Jan. 25, 2024.
(Continued)

*Primary Examiner* — Jay Trent Liddle
(74) *Attorney, Agent, or Firm* — Kilpatrick Townsend & Stockton LLP

(57) ABSTRACT

A method for implementing a modification microservice with a game cloud system is described. The method includes executing a game instance of a game. The game instance is executed using a plurality of microservices assembled for the game instance. The method further includes accessing a modification microservice engineered to be executed with the game instance. The modification microservice adds a compute capability to the game instance. The modification microservice is executed outside of a server system in which the plurality of microservices is assembled for the game instance. Also, the modification microservice is accessed by one or more application programming interface (API) calls that obtain results data from said execution of the modification microservice. The one or more API calls are managed via a modification interface that manages the access to the modification microservice and use of the results data by the game instance.

18 Claims, 11 Drawing Sheets

(56) References Cited

U.S. PATENT DOCUMENTS

2020/0306632 A1 10/2020 Kolen et al.
2022/0245131 A1 8/2022 Loeb

OTHER PUBLICATIONS

XP58138536A1, "Implementation of a service platform for online games", Proc. of ACM STGCOMM 2004 Workshops, Aug. 30, 2004, pp. 106-110, DOI: 10.1145/1016540.1016547, ISSN: 978-1-58113-942-6.
XP037669189, "Enabling rank-based distribution of microservices among containers for green cloud computing environment", Peer-to-Peer Networking and Applications, Springer, US, vol. 15, No. 1, Aug. 18, 2021, pp. 77-91, ISSN: 1936-6442, DOI: 10.1007/S12083-021-01218-Y.

* cited by examiner

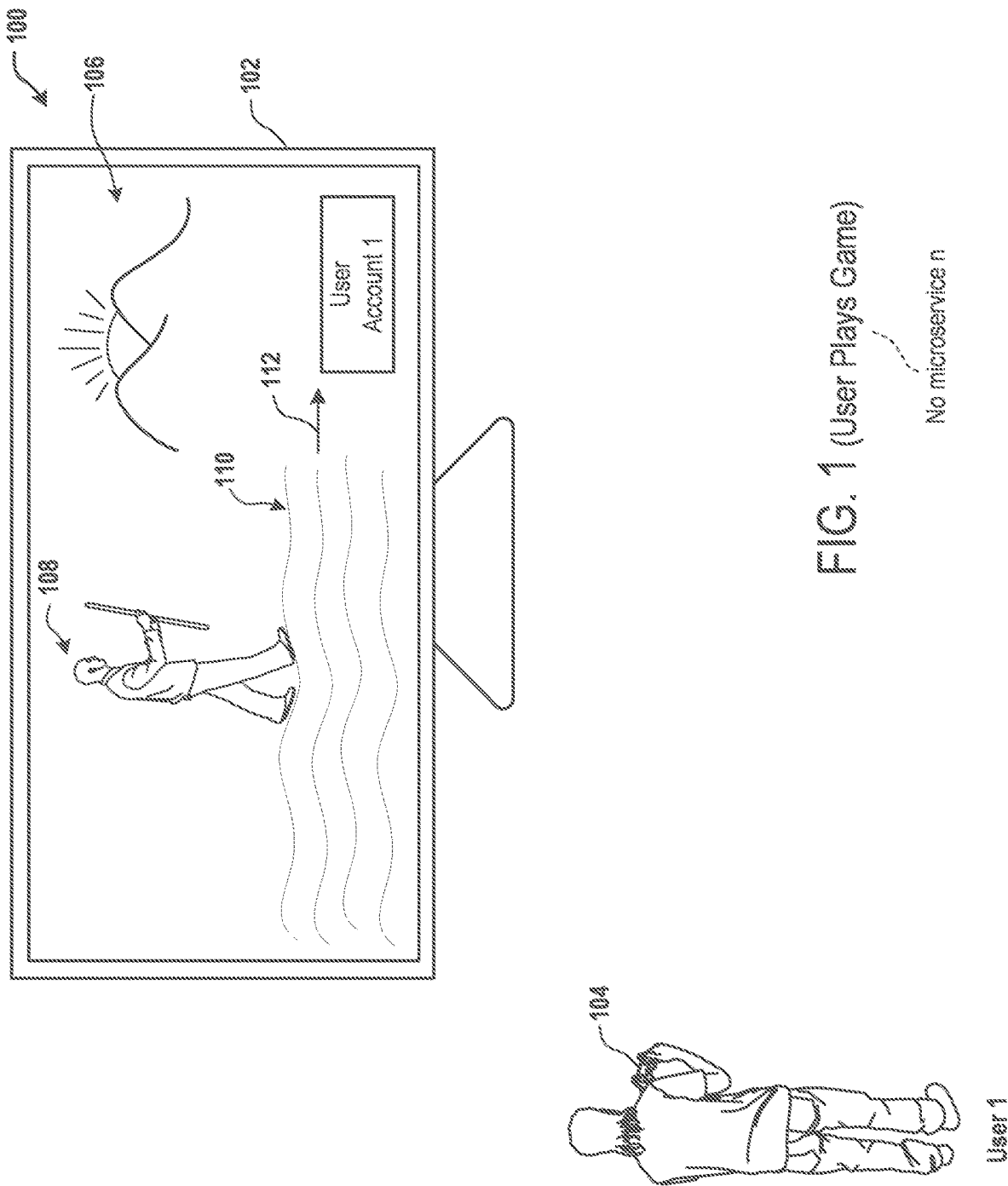
FIG. 1 (User Plays Game)

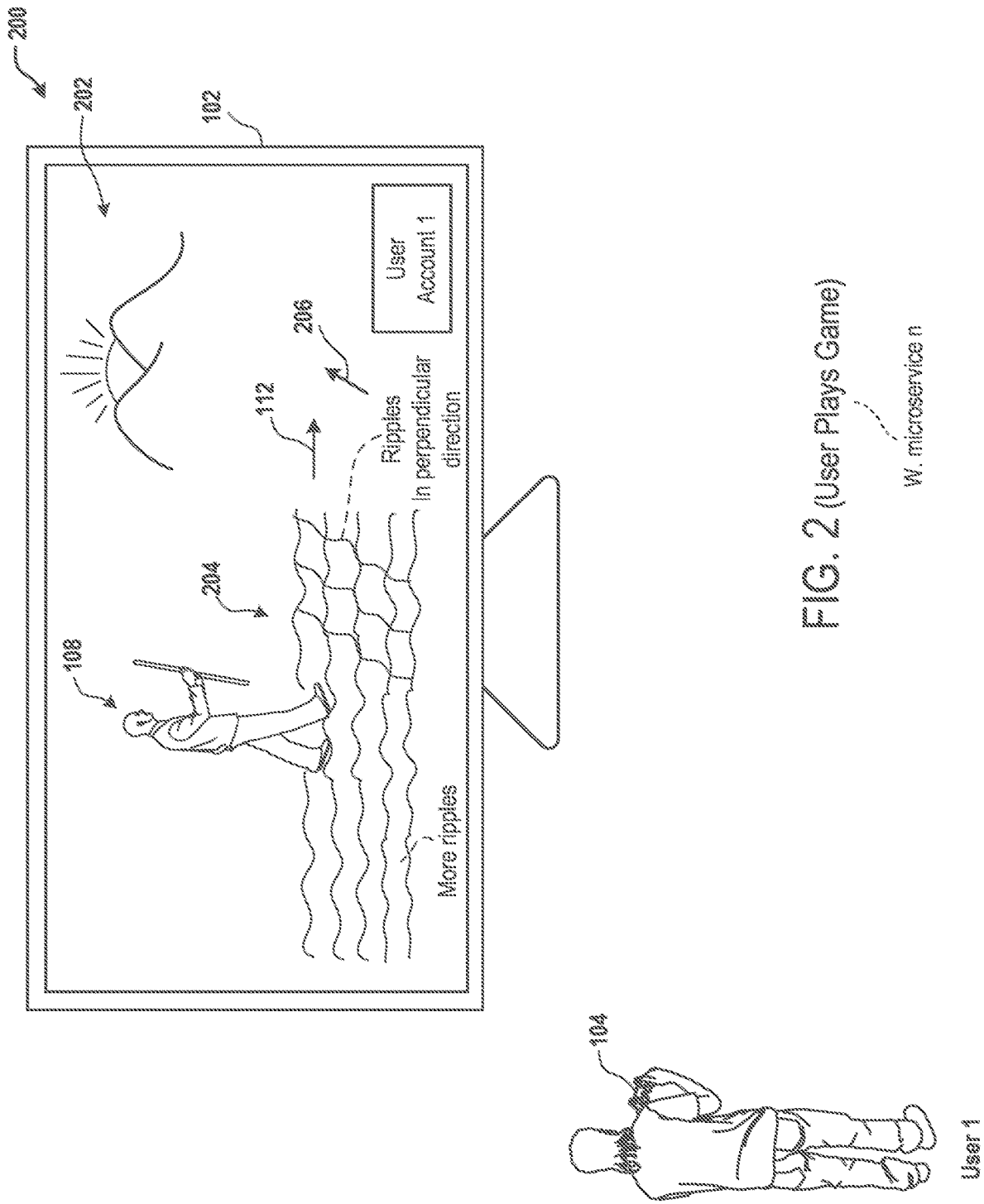
FIG. 2 (User Plays Game)

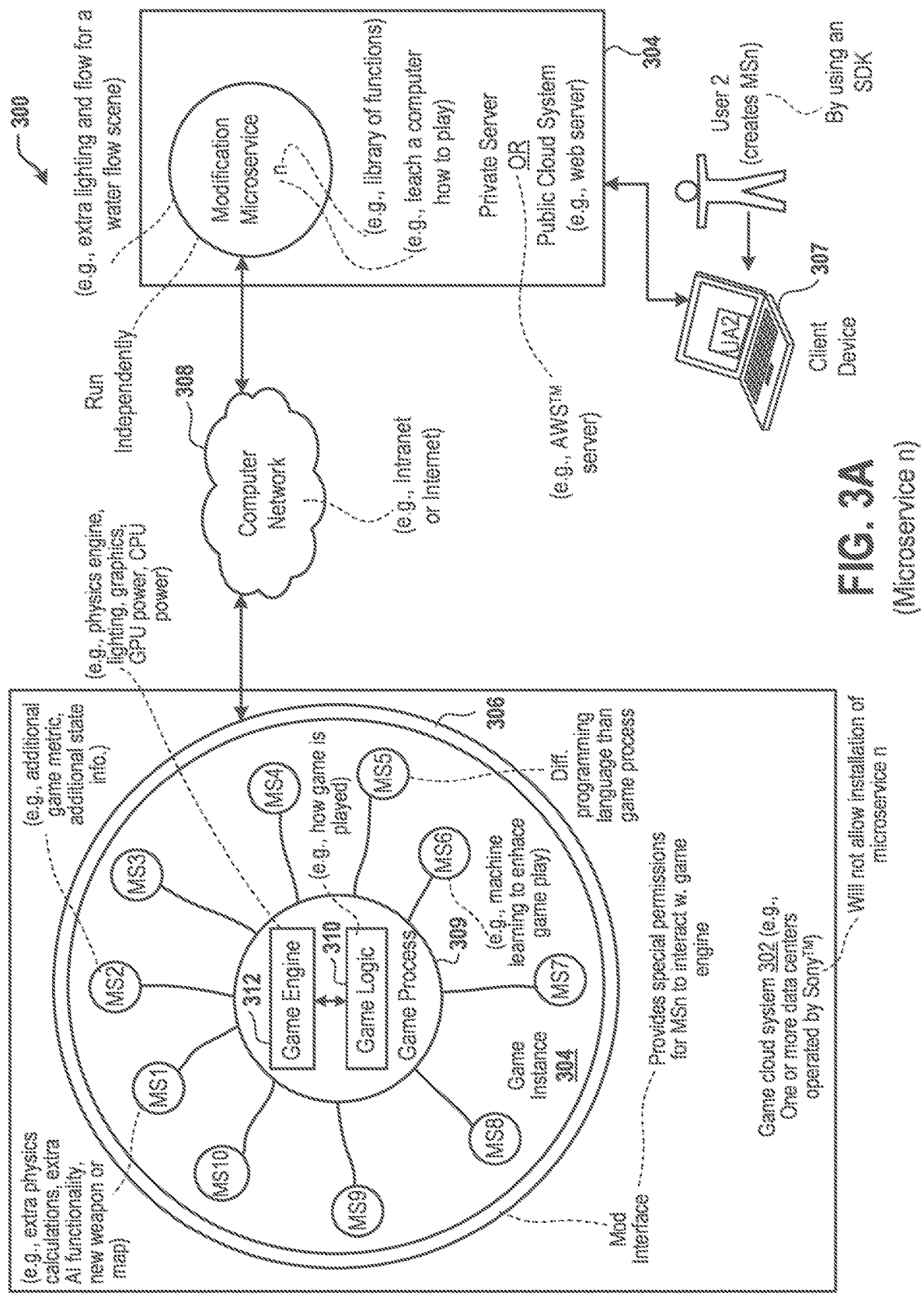
FIG. 3A (Microservice n)

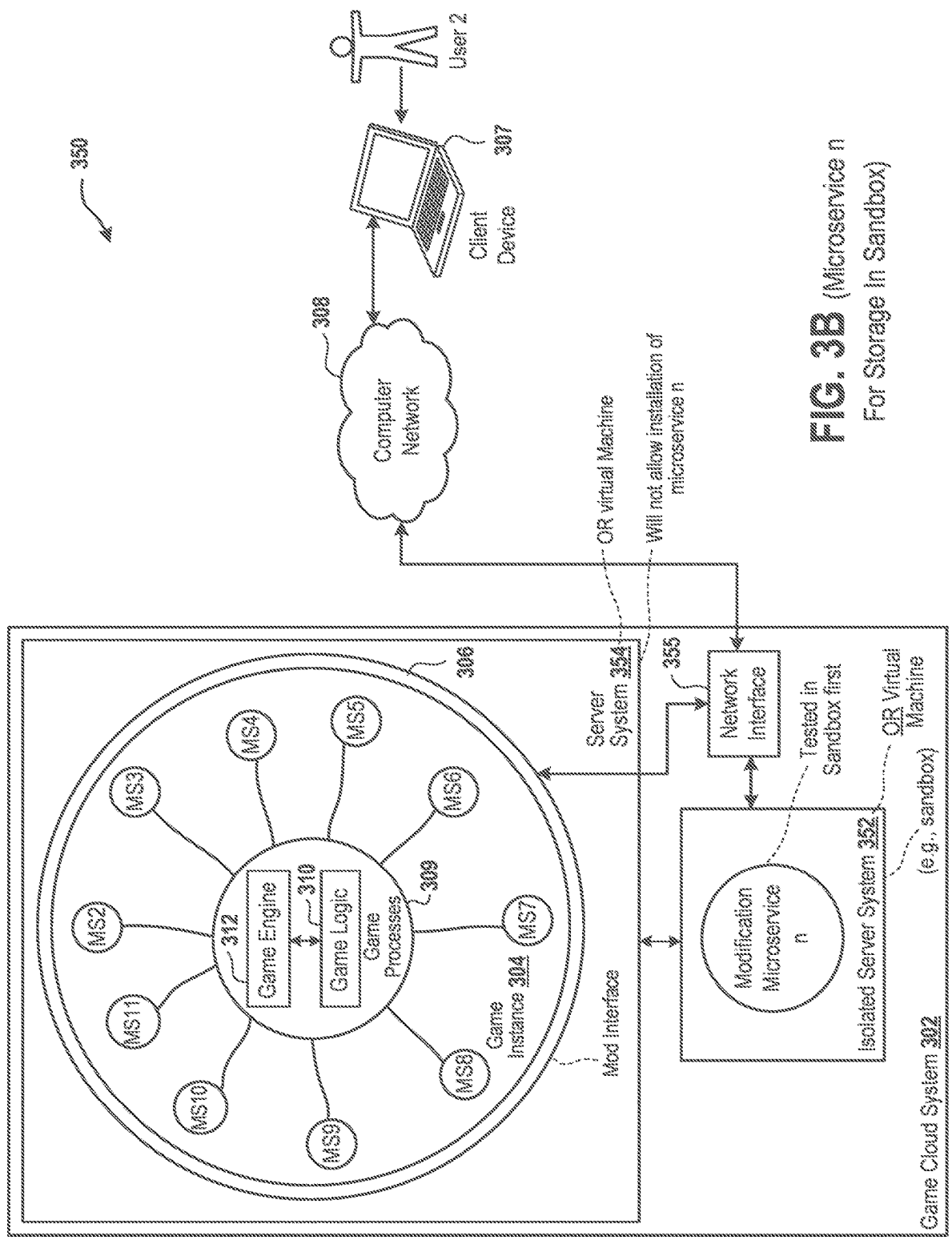
FIG. 3B (Microservice n For Storage In Sandbox)

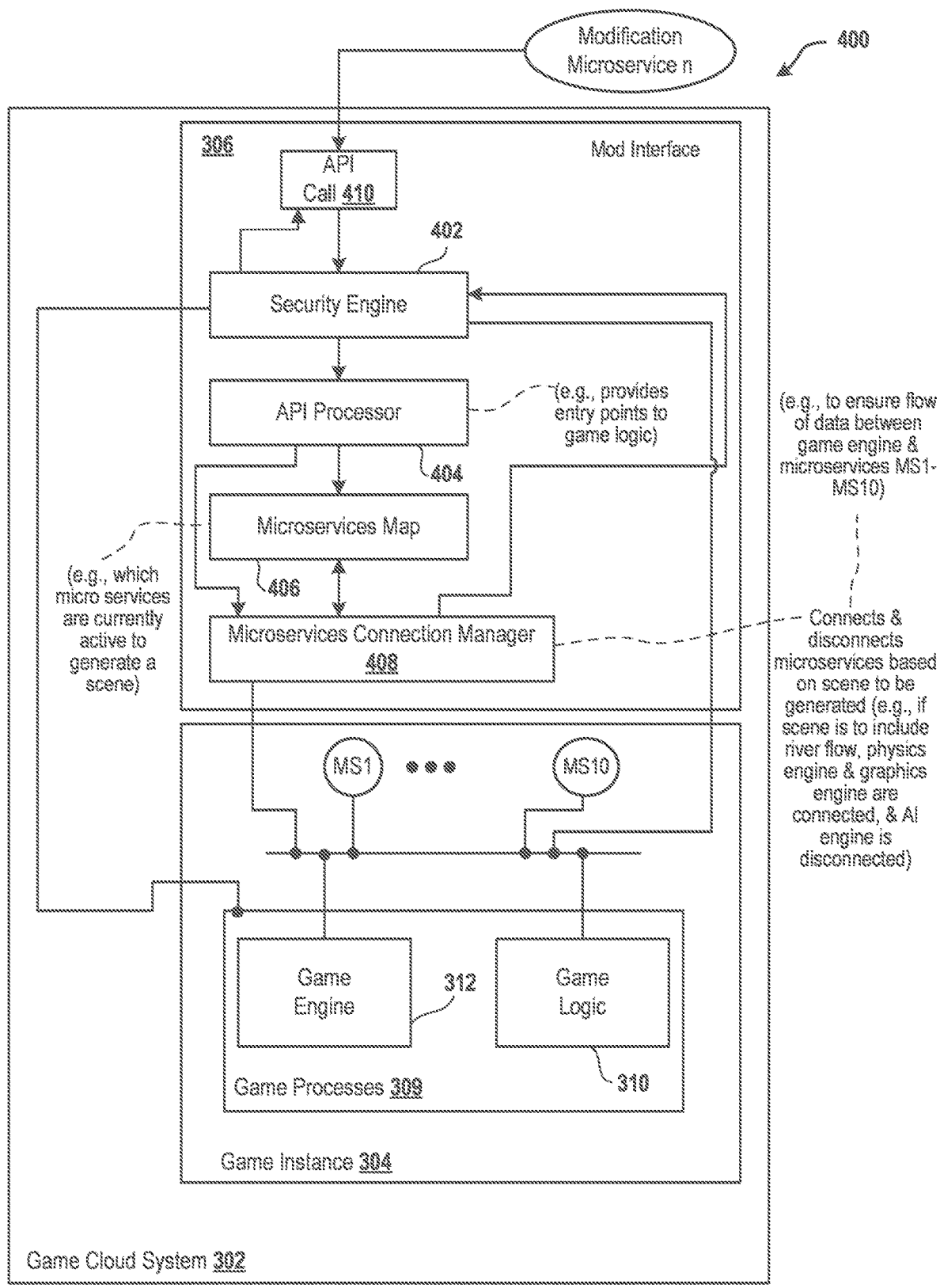
FIG. 4 (Mod Interface)

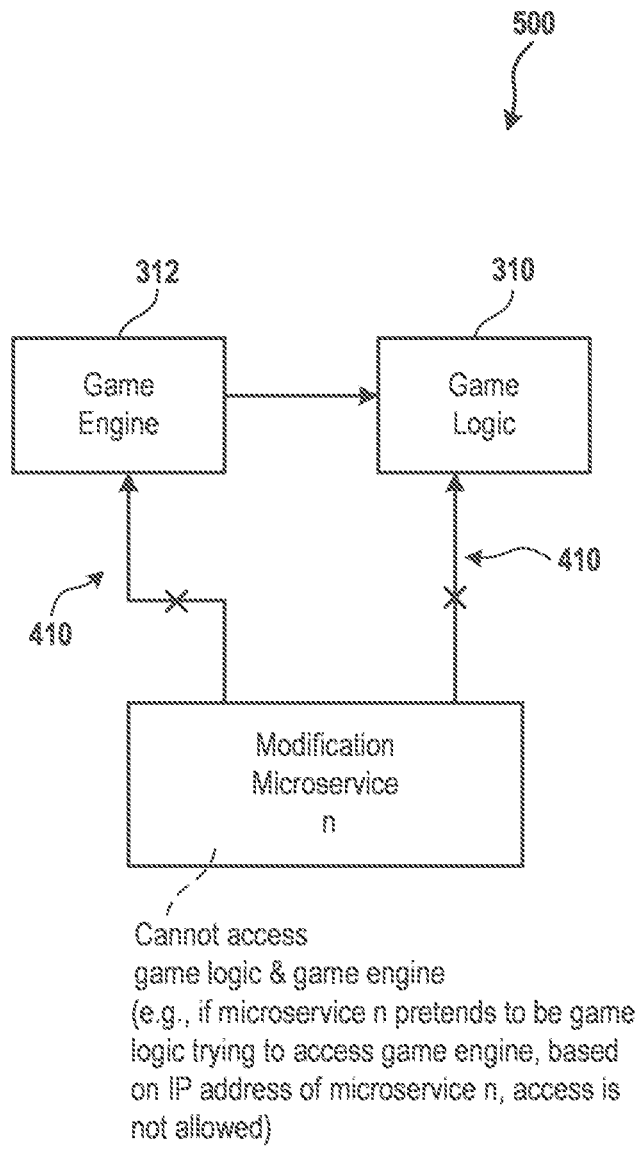
FIG. 5A (No Access to Game Logic)

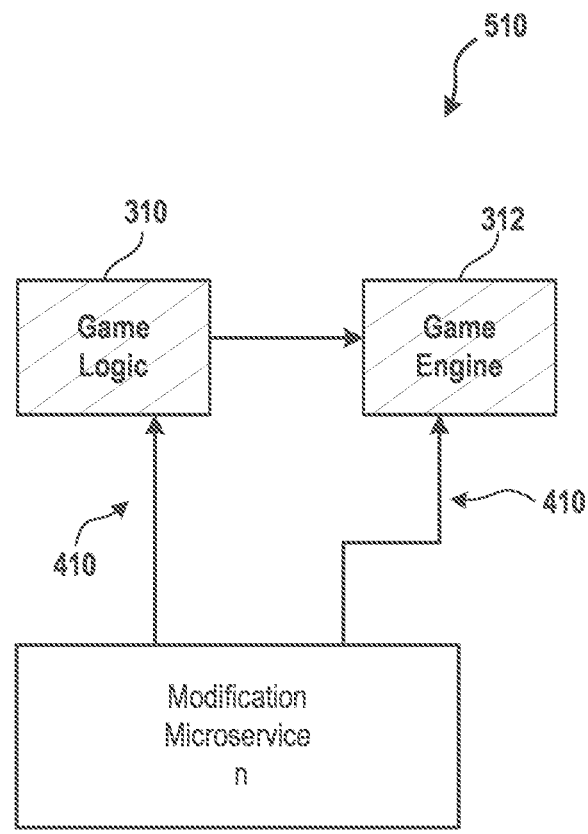
FIG. 5B (Game Logic is Obfuscated)
(e.g., memory addresses @ which game processes are stored and hidden from microservice n)

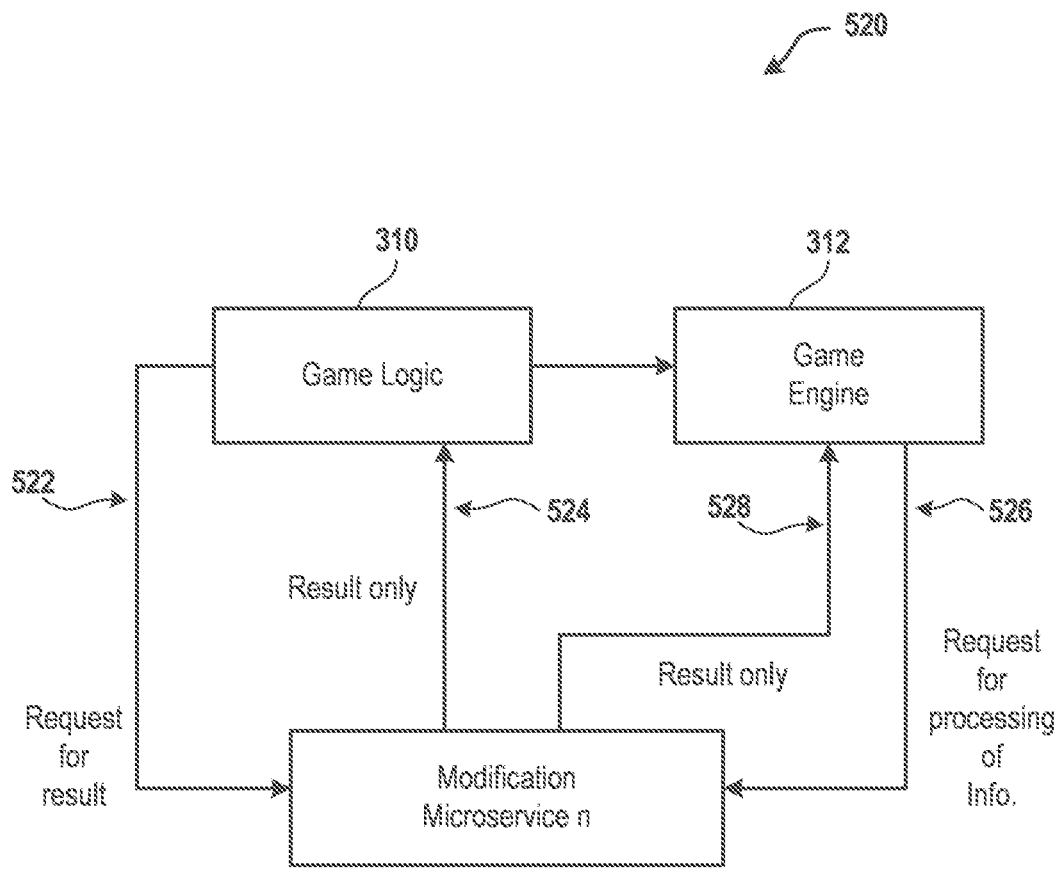
FIG. 5C (Only Results Are Provided by Microservice n)

SYSTEMS AND METHODS FOR APPLYING A MODIFICATION MICROSERVICE TO A GAME INSTANCE

FIELD

The present disclosure relates to systems and methods for applying a modification microservice to a game instance are described.

BACKGROUND

Cloud gaming is facilitated by a system of networked servers that are accessible to users via the Internet. The servers host multiple users' gaming sessions. Typically, a user is assigned a virtual server or a physical server for hosting the user's game play. Many games are complex and may last indefinite periods of time.

It is in this context that embodiments of the invention arise.

SUMMARY

Embodiments of the present disclosure provide systems and methods for applying a modification microservice to a game instance.

In an embodiment, in a cloud native world, mods can become their own microservices. The mods provide modifications to games. Through external interfaces, the mods can influence or observe the games. For example, the mods can interact with application programming interfaces provided by the game or indirectly by modifying memory addresses. As another example, the mods provide new capabilities, such as machine learning (ML) technology, to observe game play of the games by a user. As such, mods that interact with the games of a cloud system are provided.

In one embodiment, a developer creates a mod and then deploys the mod for use by the games. The developer uploads the mods to a data center. To upload the mods, security issues are resolved. For example, a mechanism is used to determine if malicious code is present in one or more of the mods during the upload. Also, the security issues are resolved during execution of the mods.

In one embodiment, a safe hardware or software environment is provided to isolate the malicious code when present in the one or more of the mods.

In an embodiment, the mods interface with one or more microservices through application programming interfaces (APIs) or some fabric. The mods allow the user to subscribe to game metrics and state information. Also, the mods interact with the games to modify or enhance a behavior of the user during a play of the games. The mods can be exclusive to the user or can be shared between multiple users.

In one embodiment, a method for implementing a modification microservice with a game cloud system is described. The method includes executing, by the game cloud system, a game instance of a game. The game instance is executed using a plurality of microservices assembled for the game instance. The method further includes accessing a modification microservice engineered to be executed with the game instance. The modification microservice adds a compute capability to the game instance. The modification microservice is executed outside of a server system in which the plurality of microservices is assembled for the game instance. Also, the modification microservice is accessed by one or more API calls that obtain results data from said execution of the modification microservice. The one or more API calls are managed via a modification interface that manages the access to the modification microservice and use of the results data by the game instance.

In an embodiment, a system for implementing a modification microservice with a game cloud system is described. The game cloud system executes a game instance of a game. The game instance is executed using a plurality of microservices assembled for the game instance. The game cloud system accesses a modification microservice engineered to be executed with the game instance. The modification microservice adds a compute capability to the game instance and is to be executed outside of a server system in which the plurality of microservices is assembled for the game instance. The modification microservice is accessed by one or more API calls to obtain results data. The results data is generated when the modification microservice is executed. The game cloud system includes a modification interface configured to manage the access to the modification microservice and use of the results data by the game instance.

In one embodiment, a non-transitory computer-readable medium containing program instructions for implementing a modification microservice with a game cloud system is described. Execution of the program instructions by one or more processors of a computer system causes the one or more processors to carry out operations of executing, by the game cloud system, a game instance of a game. The game instance is executed using a plurality of microservices assembled for the game instance. The operations further include accessing a modification microservice engineered to be executed with the game instance. The modification microservice adds a compute capability to the game instance and is to be executed outside of a server system in which the plurality of microservices is assembled for the game instance. The modification microservice is accessed by one or more API calls that obtain results data from the execution of the modification microservice. The one or more API calls are managed via a modification interface that manages the access to the modification microservice and use of the results data by the game instance.

Some advantages of the herein described systems and methods include determining whether the mods include the malicious code and if so, protecting the games from the malicious code. Additional advantages of the herein described systems and methods include increasing a compute capability of the games by facilitating a communication between the mods and the games.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which:

FIG. 1 is a diagram of an embodiment of a system to illustrate a play of a game without applying a modification microservice.

FIG. 2 is a diagram of an embodiment of a system to illustrate use of the modification microservice during a play of the game.

FIG. 3A is a diagram of an embodiment of a system to illustrate the modification microservice.

FIG. 3B is a diagram of an embodiment of a system to illustrate that the modification microservice is stored within an isolated server system of a game cloud system instead of within another cloud system.

FIG. 4 is a diagram of an embodiment of a system to illustrate a mod interface of the game cloud system.

FIG. 5A is a diagram of an embodiment of a system to illustrate that the modification microservice cannot make application programming interface (API) calls to a game engine or a game logic to modify the game engine or the game logic.

FIG. 5B is a diagram of an embodiment of a system to illustrate that the game logic and the game engine are obfuscated from the modification microservice.

FIG. 5C is a diagram of an embodiment of a system to illustrate that results of a function performed by the modification microservice are provided to the game logic or the game engine or to both the game logic and the game engine.

DETAILED DESCRIPTION

Figure 5D:
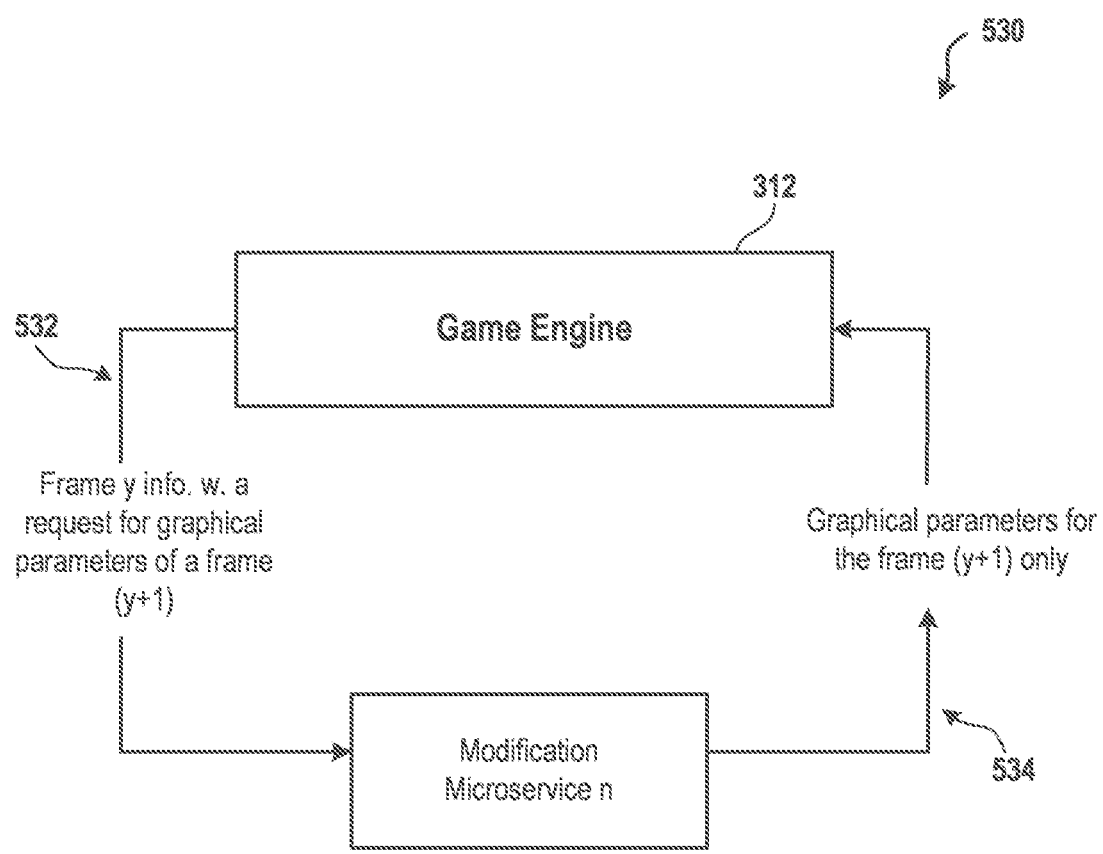
FIG. 5D is a diagram of an embodiment of a system to illustrate a method for providing security to the game engine.

Systems and methods for modifying user sentiment for applying a modification microservice to a game instance are described. It should be noted that various embodiments of the present disclosure are practiced without some or all of these specific details. In other instances, well known process operations have not been described in detail in order not to unnecessarily obscure various embodiments of the present disclosure.

FIG. 1 is a diagram of an embodiment of a system 100 to illustrate a play of a game, such as a video game, without applying a modification microservice n, where n is a positive integer. As an example, a modification microservice n is a modification to a game instance of the game. To illustrate, the modification microservice n is a code or computer software that increases compute capability of a game process of the game or of a microservice that is executed with the game. As another illustration, the modification microservice n is implemented as hardware or a combination of hardware and software. As yet another illustration, the modification microservice n is a library, such as a database, of functions. Examples of hardware include a server system, an application specific integrated circuit (ASIC), a microprocessor, a central processing unit (CPU), and a programmable logic device (PLD). Examples of software include a set of instructions or computer code or a computer program.

The system 100 includes a client device, which includes a display device 102 and a hand-held controller 104. Examples of a client device, as used herein, include a computer, a smart phone, a combination of a game console, a display device, and a hand-held controller, and a combination of a display device and a hand-held controller. Examples of a display device, as used herein, include a plasma display device, a light emitting diode (LED) display device, a liquid crystal display (LCD) display device, and a head-mounted display (HMD).

A user 1 operates the hand-held controller 104 to login to a user account 1 to access the game instance of the game from a game cloud system, which is described below. After logging into the user account 1, the user 1 operates the hand-held controller 104 to initiate a gaming session to access the game instance of the game. When the game session is initiated, the game cloud system executes the game instance to facilitate a play of the game. When the game instance is executed, the game cloud system generates one or more virtual scenes, such as a virtual scene 106, based on one or more user inputs that are received from the hand-held controller 104. When the game instance is executed to generate the virtual scene 106, the modification microservice n is not available to the game instance and therefore is not executed. The user inputs are generated when the user 1 selects one or more buttons on the hand-held controller 104. The virtual scene 106 includes a character 108 that is controlled by the user 1 via the hand-held controller 104. The character 108 is walking in a virtual river 110, which flows in a direction 112.

FIG. 2 is a diagram of an embodiment of a system 200 to illustrate use of the modification microservice n during a play of the game. The system 200 includes the client device, which includes a combination of the display device 102 and the hand-held controller 104. Again, the user 1 accesses the user account 1 to initiate a gaming session to access a game instance of the game. When the game instance is accessed, the game instance is executed by the game cloud system. Also, in addition to the execution of the game instance, the modification microservice n is executed to generate a virtual scene 202.

The virtual scene 202 includes the character 108 and a virtual river 204. The virtual river 204 has a flow in a direction 206 in addition to the flow in the direction 112. The direction 206 is perpendicular to the direction 112. For example, ripples of the virtual river 204 are created in the direction 206 in addition to the direction 112. As such, an extra capability is added to the execution of the game instance by executing the modification microservice n simultaneously with the execution of the game instance.

FIG. 3A is a diagram of an embodiment of a system 300 to illustrate the modification microservice n. The system 300 includes a game cloud system 302, a cloud system 304, and a client device 307. An example of a cloud system, as used herein, is a server system that includes one or more servers. The system 300 also includes a computer network 308. Examples of a computer network, as used herein, include a wide area network (WAN) or a local area network (LAN) or a combination thereof.

It should be noted that the one or more servers are used to implement one or more virtual machines (VMs). Each server includes one or more processors, one or more server accelerators, and one or more memory devices. The one or more processors are coupled to the one or more server accelerators and to the one or more memory devices. Examples of a processor include an ASIC, a CPU, a graphical processing unit (GPU), microprocessor, a microcontroller, and a PLD. An example of a server accelerator, as used herein, of a server is a hardware accelerator, such as a Peripheral Component Interconnect (PCI) card, that generates encryption keys using encryption algorithms to handle secure encrypted data transfer between a client device, described herein, and the server. Examples of a memory device include a read-only memory (ROM) and a random-access memory (RAM).

As an example, the cloud system 304 includes one or more private servers or one or more public servers. To illustrate, the cloud system 304 is controlled and managed by an entity that is different from an entity that manages the game cloud system 302. To further illustrate, the cloud system 304 includes one or more data centers that provide Amazon Web Services™ and the game cloud system 302 is controlled and managed by Sony Corporation™ As another illustration, the cloud system 304 includes one or more web servers that host one or more websites for allowing uploads of microservices from client devices operated by developers of the microservices.

The game cloud system 302 includes a game instance 304 and a mod interface 306. It should be noted that the terms mod and modification are used herein interchangeably. The mod interface 306 is implemented using software, described herein, or hardware, described herein, or a combination of software and hardware. Also, the game instance 304 is implemented using software, described herein, or hardware, described herein, or a combination of software and hardware. For example, the game instance 304 is executed by one or more processors of the game cloud system 302 to generate data for displaying one or more virtual scenes of the video game on the display device 102 (FIG. 1).

It should be noted that the modification micro service n is a different computer software than a computer software of the game logic 310, the game engine 312, and any of the microservices MS1 through MS10. For example, the modification microservice n is a software application and the game logic 310, the game engine 312, or any of the microservices MS1 through MS10 is another software application. As such, the modification microservice n communicates with the game instance 304 via an application programming interface (API).

The game instance 304 includes game processes 309, which include a game engine 312 and a game logic 310. As an example, the game engine 312 includes one or more of a physics engine, a sound engine, a networking engine, a memory management engine, an artificial intelligence (AI) engine, a machine learning (ML) engine, an animation engine, and a graphics engine. To illustrate, the game engine 312 includes the physics engine, the sound engine, and the graphics engine but excludes the AI and ML engines. To further illustrate, each engine within the game engine 312 is implemented using hardware or software or a combination thereof. As an example, an engine, as used herein, includes hardware or software or a combination thereof.

The terms AI engine and AI model are used herein interchangeably. Also, the terms ML engine and ML model are used herein interchangeably. As an example, the graphics engine includes a lighting engine, a texture engine, a color engine, and an intensity engine. To illustrate, the graphics engine includes a rendering engine for displaying two-dimensional or three-dimensional graphics of one or more virtual scenes, such as the virtual scene 106 or 202, described herein. Also, as an example, the physics engine includes relevant libraries and support programs for applying laws of physics, such as collision detection, to the game.

As an example, the game logic 310 is implemented as hardware of software or a combination thereof to allow the user 1 to play the game. For example, the game logic 310 includes a game code for different video games, such as World of Warcraft™, of Fortnite™, or Apex Legends™, that allows the user 1 to play the video games. To illustrate, the game logic 310 indicates that the video game is about car racing or about sorcery or about adventure, and includes all virtual objects, including virtual characters, and virtual backgrounds to facilitate a play of the video game. In the illustration, the game logic 310 of the car racing video game has virtual race cars and virtual race tracks and the game logic 310 of Fortnite™ has virtual characters with weapons and virtual trees. Examples of virtual objects, as described herein, include virtual cars, virtual avatars, virtual trees, and virtual weapons. As another illustration, the game logic 310 defines how to play the video game. Also, the game instance 304 includes multiple micro services, which are labeled as MS1, MS2, MS3, MS4, MS5, MS6, MS7, MS8, MS9, and MS10, where MS stands for microservice. Examples of a microservice, as used herein, include a service that provides extra physics calculation to the game engine 312, or extra AI capability to the game engine 312, or adds statistical calculation capabilities to the game logic 310, or adds state information calculation capabilities to the game engine 312, or adds a new virtual weapon to the game logic 310, or adds a new virtual map to the game logic 310. To illustrate, one or more of the microservices MS1 through MS10 and the modification microservice n are provided access to game state or streaming information, such as audio frames, video frames, button presses, and game high scores, etc., associated with play of the video game by the user 1 via the user account 1. In the illustration, the access is provided directly through the game processes 309 or by leveraging, e.g., cloud gaming technology for like video or audio or button input. By accessing the game state or streaming information, the one or more of the microservices MS1 through MS10 and the modification microservice n learns how the user 1 plays through machine learning to build a model of game play of the user 1. The one or more of the microservices MS1 through MS10 and the modification microservice n can then play the video game instead of the user 1. Alternatively, the one or more of the microservices MS1 through MS10 and the modification microservice n can learn how the user 1 plays the video game and control virtual enemies that play against a virtual character controlled by the user 1 to be more or less intelligent compared to the virtual character. Examples of the game states associated with the play of the video game by the user 1 include tracking high scores and how frequently the user 1 kills virtual enemies in the video game, etc. This can be leveraged in various eSports or broadcast-related applications.

The microservices MS1 through MS10 are coupled to the game processes 309. For example, the game processes 309 call the microservices MS1 through MS10 to assemble the microservices MS1 through MS10 with the game logic 310 and the game engine 312 to form the game instance 304. When the microservices MS1 through MS10 are called, the microservices MS1 through MS10 are executed by the game cloud system 302 in conjunction with, such as simultaneously with, the game processes 309.

It should be noted that a different assembly of microservices creates a different game instance. For example, a first game instance is created by the game cloud system 302 when the game processes 309 are executed with one or more of the microservices MS1 through MS8, and a second game instance is created by the game cloud system 302 when the game processes 309 are executed with one or more of the microservices MS1 through MS10.

A user 2, such as a microservice developer or a microservice coder or a microservice creator, creates the modification microservice n using the client device 307. For example, the user 2 uses a software development kit (SDK) to create the microservice n or writes a code to create the microservice n by using the client device 307. The microservice n is created based on the game instance 304. For example, the user 2 develops, such as engineers, the microservice n to add the compute capability to the game logic 310 or the game engine 312 or one of the microservices MS1 through MS10. The user 2 then uploads the modification microservice n to the cloud system 304 via a network, such as a computer network. For example, the user 2 logs into a user account 2 assigned by the cloud system 304 to the user 2. After logging into the user account 2, the user 2 accesses an interface on the client device 307 and selects an upload button on the interface to upload the modification microservice n to the cloud system 304. Once the upload button is selected, one or more processors of the cloud system 304 receive the modification microservice n from the client device 307 and store the modification microservice n in one or more memory devices of the cloud system 304. The modification microservice n is stored within the one or more memory devices of the cloud system 304 to be executed outside of the game cloud system 302.

Once the modification microservice n is uploaded to the cloud system 304, the game processes 309 are informed of existence of the modification microservice n. For example, once the modification microservice n is uploaded to the cloud system 304, the modification microservice n is registered to a microservice registration database or a microservice registration data store that is managed by a microservice registration service (not shown). To illustrate, the cloud system 304 generates and sends an indication to the microservice registration service regarding reception of the modification microservice n from the client device 307. The game processes 309, upon execution, query the microservice registration service. The query is regarding any new modification microservices that are registered by the microservice registration service since a preceding query, which is previously sent from the game processes 309 to the microservice registration service. In the illustration, upon receiving the query, the microservice registration service provides a response to the query that the modification microservice n is recently received from the client device 307. The response is provided via the computer network 308 to the game processes 309.

As another example of informing the game processes 309, when the game processes 309 are accessed by the client device 307 operated by the user 2 via the computer network 308 after logging into the user account 2, the game processes 309 are informed of existence of the modification microservice n by the client device 307. To illustrate, the client device 307 operated by the user 2 has metadata indicating the existence of the modification microservice n. When the game processes 309 are accessed by the client device 307, the client device 307 informs the game processes 309 of the existence of the modification microservice n within the cloud system 304. To further illustrate, the client device 307 has a setting that is controlled by the user 2 to indicate the existence of the modification microservice n to the game processes 309. As another further illustration, the metadata is stored within the client device 307 indicating the existence of the modification microservice n. As an example, the microservice registration service is implemented as hardware or software or a combination thereof, and is coupled to the cloud system 304 via the computer network 308. As another example, the microservice registration service is stored and executed by the cloud system 304.

The modification microservice n is accessed, such as requested to execute, via one or more API calls and the computer network 308 from the cloud system 304 after the modification microservice n is uploaded and stored in the one or more memory devices of the cloud system 304.

Upon determining that the modification microservice n is registered with the microservice registration service, the modification microservice n is accessed by the game cloud system 302 not to download the modification microservice n the game cloud system 302 but to execute the modification microservice n stored in the cloud system 304. As an example, the modification microservice n is accessed when the user 1 is a subscriber of the modification microservice n via the user account 1. As another example, the user 1 does not have the access and the game processes 309 provides a mechanism to the user 1 to subscribe to the modification microservice n. As another example, the game cloud system 302 denies any request from the modification microservice n for being uploaded to the game cloud system 302. To access the modification microservice n, the game cloud system 302 generates and sends one or more API calls to the modification microservice n via the computer network 308.

Examples of the modification microservice n include a service that provides the compute capability to the game logic 310, or the game engine 312, or one or more of the microservices 1 through n, or increases the compute capability of the game logic 310, or the game engine 312, or one or more of the microservices 1 through n, or a combination thereof. To illustrate, the modification microservice n adds extra physics calculation to the microservice 1, or extra AI capability to the game engine 312, or adds statistical calculation capabilities to the microservice 2, or adds state information calculation capabilities to the game engine 312, or adds a new virtual weapon to the game logic 310, or adds a new virtual map to the game logic 310. In the illustration, the game instance 304 has the compute capability and the compute capability is enhanced, such as increased, by the modification microservice n. As another illustration, the modification microservice n provides, such as adds, the compute capability, e.g., extra lighting or the flow of virtual water in the direction 206 (FIG. 2), to the game instance 304. In the other illustration, the game instance 304 does not have the compute capability before it is added by the modification microservice n.

The mod interface 306 provides special permissions to the modification microservice n to enable the modification microservice n to interact with the game instance 304. For example, the mod interface 306 provides a security engine to allow the modification microservice n to interact with the game instance 304. To illustrate, the mod interface 306 does not allow the modification microservice n to be integrated within a code of the game logic 310 or a code of the game engine 312 or a code of any of the microservices 1 through 10. In the illustration, the modification microservice n is accessed by the game instance 304 via the mod interface 306 and the computer network 308 from the cloud system 304. In the illustration, the modification microservice n is executed by the cloud system 304 and not by the game cloud system 302. In this manner, when the modification microservice n is executed by the cloud system 304 instead of by the game cloud system 302, the modification microservice n is run independently from execution of the game instance 304 by the game cloud system 302. As another illustration, when the modification microservice n is executed, the mod interface 306 receives a request from the cloud system 304 to be stored within the game cloud system 302 via the computer network 308. In the illustration, the mod interface 306 denies the request.

FIG. 3B is a diagram of an embodiment of a system 350 to illustrate that the modification microservice n is stored within an isolated server system 352 of the game cloud system 302 instead of within the cloud system 304 (FIG. 3A). The system 350 includes the client device 307, the computer network 308, and the game cloud system 302.

The game cloud system 302 includes a server system 354 and the isolated server system 352. For example, the server system 354 includes a first set of servers and the isolated server system 352 includes a second set of servers. To illustrate, the first set of servers are located in a first data center and the second set of servers are located in a second data center. In the illustration, an internet protocol (IP) address of any of the servers in the first set is different from an IP address of any of the servers of the second set. As another illustration, a media access control (MAC) address of any of the servers of the first set is different from a MAC address of any of the servers of the second set. As another example, the mod interface 306 of the server system 354 does not allow the modification microservice n to be stored in one or more memory devices of the server system 354. In the example, the mod interface 306 of the server system 354 does not allow the any of the game engine 312, the game logic 310, and the microservices 1 through 10 to be stored in one or more memory devices of the isolated server system 352. The isolated server system 352 provides a sandbox for executing the modification microservice n.

The game cloud system 302 includes a network interface 355, such as a network interface controller or a network interface card (NIC). The network interface 355 enables the server system 354 and the isolated server system 352 to connect to the computer network 308. The mod interface 306 provides an instruction to the network interface 355 to inform the mod interface 306 of receipt of the modification microservice n by the game cloud system 302 and an instruction to send the modification microservice n to the isolated server system 352 instead of the server system 354. The network interface 355 is coupled to the mod interface 306 and the isolated server system 352.

The isolated server system 352 is coupled to the server system 354 via a fabric, such as a set of switches. For example, the isolated server system 352 is implemented with a server rack and the server system 354 is implemented within another server rack, and the isolated server system 352 is coupled to the server system 354 via a high performance and a low latency fabric between the server racks.

The user 2 uses the client device 307 to develop the modification microservice n. Upon creating the microservice n, the user 2 uses the client device 307 to generate a request to upload the microservice n to the game cloud system 302. The request includes an identity, such as a series of alphanumeric characters, of the modification microservice n and an instruction to store the modification microservice n within the game cloud system 302. The request further includes a network address, such as an IP address, of the client device 307. The client device 307 sends the request via the computer network 308 to the network interface 355.

In response to receiving the request, the network interface 355 parses the request to identify the network address of the client device 307 to further determine that the request is received via the computer network 308 from the client device 307. Moreover, the network interface 355 parses the request to identify the modification microservice n within the request. Based on the instruction received from the mod interface 306 regarding informing the mod interface 306 regarding the receipt of the modification microservice n, the network interface 355 informs the mod interface 306 of the reception and identity of the modification microservice n. For example, the network interface 355 sends the identity of the modification microservice n to the mod interface 306.

Also, based on the instruction regarding sending the modification microservice n to the isolated server system 352 instead of the server system 354, the network interface 352 sends the modification microservice n to the isolated server system 352 for storage. For example, the network interface 352 does not send the modification microservice n to the server system 354. Upon receiving the modification microservice n from the network interface 355, the one or more processors of the isolated server system 302 store the modification microservice n in one or more memory devices of the isolated server system 302. The modification microservice n is stored within the one or more memory devices of the isolated server system 352 to be executed outside of the server system 354.

Also, once the modification microservice n is stored within the isolated server system 352, the game processes 309 is informed of existence of the modification microservice n. For example, once the modification microservice n is stored within the isolated server system 352, the modification microservice n is registered to the microservice registration database or the microservice registration data store that is managed by the microservice registration service (not shown). To illustrate, the isolated server system 352 generates and sends an indication to the microservice registration service via the network interface 355 regarding reception of the modification microservice n from the client device 307. In the illustration, the game processes 309 are informed of existence of the modification microservice n in one of several manners described above. As an example, the microservice registration service is coupled to the game cloud system 302 via the computer network 308.

Once the modification microservice n is stored within the isolated server system 352 and the game processes 309 are informed of the existence of the modification microservice n, the modification microservice n is accessed, such as requested to execute, by the server system 354 via one or more API calls from the isolated server system 302. The modification microservice n is accessed by the server system 354 not to download the modification microservice n the server system 354 but to execute the modification microservice n stored in the isolated server system 352. To access the modification microservice n, the game instance 309 of the server system 354 generates and sends one or more API calls to the modification microservice n. The isolated server system 352 executes the modification microservice n upon receiving the one or more API calls from the game instance 309 of the server system 354.

In one embodiment, the modification microservice n can be accessed by multiple users via multiple user accounts. For example, the cloud system 304 (FIG. 3A) or the isolated server system 352 has resources, such as the one or more servers, that can execute multiple instances of the modification microservice n to service the multiple user accounts. After the cloud system 304 or the isolated server system 352 runs out of resources to execute an additional instance of the modification microservice n in addition to the multiple instances, another hardware resource, such as another cloud system or another isolated server, is used. As another example, one or more processors of one or more servers create and manage a user-microservice database, such as a list of correspondences between user accounts and the microservices MS1 through MS10 and the modification microservice n. Upon receiving a request from the client device operated by the user 1 to access one of the microservices MS1 through MS 10 and the modification microservice n or a feature of the one of the microservices MS1 through MS 10 and the modification microservice n, the user-microservice database is accessed by the security engine 402 or by a user-microservice engine to determine whether the user account 1 is allowed the access. In the illustration, the security engine 402 or the user-microservice engine accesses the user-microservice database to determine whether the user account 1 is allowed the access. Upon determining that the user-microservice database does not include a one-to-one correspondence between the user account 1 and the one of the microservices MS1 through MS 10 and the modification microservice n in the list, the security engine 402 or the user-microservice engine does not allow the access. On the other hand, upon determining that the user-microservice database includes the correspondence, the security engine 402 or the user-microservice engine is allowed the access. In the illustration, the user-microservice engine is coupled to the security engine 402 via the computer network 308 or is located within the game cloud system 302.

As yet another example, upon receiving a request from the client device 307 operated by the user 2 to access one of the microservices MS1 through MS 10 and the modification microservice n or the feature of the one of the microservices MS1 through MS 10 and the modification microservice n, the user-microservice database is accessed by the security engine 402 or by the user-microservice engine to determine whether the user account 2 is allowed the access. In the illustration, the user 2 is an online friend, such as a social network friend or a gaming network friend, of the user 1. In the illustration, the security engine 402 or the user-microservice engine accesses the user-microservice database to determine whether the user account 2 is allowed the access. Upon determining that the user-microservice database does not include a correspondence between the user account 2 and the one of the microservices MS1 through MS 10 and the modification microservice n, the security engine 402 or the user-microservice engine does not allow the access. On the other hand, upon determining that the user-microservice database includes the correspondence, the security engine 402 or the user-microservice engine is allowed the access. As still another example, the client device having the display device 102 and the hand-held controller 104 (FIG. 1) and operated by the user 1, is provided with the list.

FIG. 4 is a diagram of an embodiment of a system 400 to illustrate the mod interface 306 of the game cloud system 302. The mod interface 306 includes a security engine 402, an API processor 404, a microservices map 406, and a microservices connection manager 408. Each of the security engine 402 and the microservices connection manager 408 is implemented as hardware or software or a combination thereof. Also, the microservices map 406 is a database that is stored in one or more memory devices of the mod interface 306. To illustrate, the microservices map 406 includes an indication of connection between the microservices MS1 through MS10 and the game processes 309 of the game instance 304. In the illustration, the microservices map 406 includes an indication that the microservices MS1 through MS10 are being executed by the game cloud system 302 simultaneously with the execution of the game processes 309.

The API processor 404 includes a list of entry points within the game instance 304 and functions performed by the game instance 304. For example, the list of entry points is requested by and received from the game logic 310 by the API processor 404. To illustrate, the list includes an entry point to add the flow of water in the direction 206 (FIG. 2). In the illustration, the entry point is received from the game logic 310. As another example, the list of entry points is requested by and received from the game engine 312 by the API processor 404. To illustrate, the list includes an entry point to add lighting to graphics for generating data regarding the flow of water in the direction 206 (FIG. 2). In the illustration, the entry point is received from the game engine 312. As another example, the list of entry points is requested by and received from one or more of the microservices MS1 through MS10 by the API processor 404. To illustrate, the list includes an entry point to add AI capability for capturing data regarding a play of the video game by the user 1 via the user account 1 and output a pattern generated based on the data. In the illustration, the entry point is received from the microservice MS1 or the game logic 310. As another illustration, the AI capability is added to one or more of the microservices MS1 through MS10 or to the game logic 310 or to the game engine 312. In the illustration, the one or more of the microservices MS1 through MS10 or to the game logic 310 or to the game engine 312 are not modified to add the AI capability. Rather, in the illustration, the AI engine of the modification microservice n is executed to train the AI engine based on play of the video game by the user 1 and results of execution of the AI engine are provided to the one or more of the microservices MS1 through MS10 or to the game logic 310 or to the game engine 312.

As another example, the API processor 404 includes an indication that the game logic 310 has a code to generate data, such as virtual ripples, indication the flow of water. In the example, the generation of data to indicate the flow of water is an example of functions performed by execution of the game logic 310. As another example, the API processor 404 includes an indication that the microservice MS1 implements the AI engine to collect data regarding play of the video game by the user 1 to identify a pattern of play of the video game by the user 1. To illustrate, the data regarding the play includes input data indicating selection of buttons on the hand-held controller 104 (FIG. 1) and image data identifying movements of one or more body parts, such as eyes, hands, and legs, of the user 1 during a play of the video game 1. In the illustration, the image data is captured by one or more digital cameras and the input data is generated by the hand-held controller 104. In the example, the collection of data regarding play of the video game by the user 1 to identify the pattern of play of the video game by the user 1 is an example of functions performed by execution of the microservice MS1.

The microservices connection manager 408 includes one or more network locations, such as one or more IP addresses or one or more uniform resource locator (URL) addresses, of one or more servers of the game cloud system 302 that execute the game instance 304. Also, the microservices connection manager 408 includes one or more network locations, of one or more servers that execute the modification microservice n.

The security engine 402 is coupled to the API processor 404, which is coupled to the microservices map 406. The microservices map 406 is coupled to the microservices connection manager 408. The microservices connection manager 408 is coupled to the game processes 309 and to the microservices MS1 through MS10. The security engine 402 is coupled to the game processes 309 and to the microservices MS1 through MS10. The API processor 404 is coupled to the microservices connection manager 408. The microservices connection manager 408 is coupled to the security engine 402. The security engine 402 is coupled to the game instance 304.

An API call 410 is generated by the modification microservice n. The API call 410 is received from the modification microservice n by the security engine 402. For example, the API call 410 is to provide the compute capability to the game engine 312 or the game logic 310 or one or more of the microservices MS1 through MS10. To illustrate, the API call 410 includes one or more network locations, such as one or more IP addresses or one or more URLs, of the one or more servers that execute the modification microservice n. Also, in the illustration, the API call 410 indicates that the modification microservice n includes instructions to include the flow of virtual water in the direction 206 (FIG. 2). As yet another example, the API call 410 includes the one or more network locations, such as one or more IP addresses or one or more URLs, of the one or more servers that execute the modification microservice n. Moreover, in the example, the API call 410 indicates that the modification microservice n includes instructions to add the AI engine, such as the ML engine, to learn how the user 1 plays the video game to allow the AI engine to play the video game in the same manner as that of the user 1.

As another example, the API call 410 includes the one or more network locations, such as one or more IP addresses or one or more URLs, of the one or more servers that execute the modification microservice n. Also, in the example, the API call 410 indicates that the modification microservice n includes instructions to use additional servers of the cloud system 304 (FIG. 3A) to add the compute capability. In the example, the additional servers are not being used by the game cloud system 302 to execute the game processes 309 and the microservices MS1 through MS10. As yet another example, the API call 410 includes instructions to add lighting to a virtual scene of the video game.

Upon receiving the API call 410, the security engine 402 determines whether the API call 410 is valid. For example, the security engine 402 determines whether the API call 410 is to enhance the compute capability at an entry point in the video game designated by the game processes 309. To illustrate, the security engine 402 determines whether the API call 410 is to include the flow of virtual water in the direction 206 (FIG. 2) at the entry point. In the illustration, upon determining so, the security engine 402 sends a request to the API processor 404 to determine whether the game logic 310 includes a code to generate data indication the flow of water and to determine whether the code of the game logic 310 includes the entry point. Upon receiving the request, the API processor 404 provides a response to the request indicating whether the game logic 310 includes the code to generate data indicating the flow of water and whether the code of the game logic 310 includes the entry point to add the flow of water in the direction 206. In the illustration, upon receiving the response indicating that the game logic 310 includes the code to generate data indicating the flow of water and that the code of the game logic 310 includes the entry point to add the flow of water in the direction 206, the security engine 402 validates the API call 410. On the other hand, in the illustration, upon receiving the response indicating that the game logic 310 does not include the code to generate data indicating the flow of water and/or that the code of the game logic 310 does not include the entry point to add the flow of water in the direction 206, the security engine 402 invalidates the API call 410.

As another example, the security engine 402 determines whether the API call 410 is to enhance the compute capability of the game processes 309 and/or the microservices 1 through 10 by providing access to the AI engine, such as the ML engine, to enhance game play of the video game by the user 1 (FIG. 1). To illustrate, the security engine 402 parses the API call 410 to identify that the API call 410 is to facilitate communication with the modification microservice n to implement the AI engine to collect the data regarding play of the video game by the user 1. In the illustration, the security engine 402 parses the API call 410 to identify that the API call 410 includes an indication regarding implementation of the AI engine. In the illustration, the security engine 402 determines that the AI engine indicated within the API call 410 accepts data at its input and outputs a pattern at its output to determine that the API call 410 includes the indication regarding implementation of the AI engine. Also, in the illustration, the security engine 402 sends the indication regarding implementation of the AI engine to the API processor 404 and requests a response from the API processor 404 whether the AI engine is already being implemented. Continuing with illustration, upon receiving a response from the game instance 304, such as the microservice MS1, that the game instance 304 provides the AI engine to collect the data regarding play of the video game by the user 1, the security engine 402 determines that the API call 410 is invalid. On the other hand, in the illustration, upon receiving a response from the API processor 404 that none of the game logic 310 and the microservices 1 through 10 provide the AI engine to collect the data regarding play of the video game by the user 1, the security engine 402 determines that the API call 410 is valid.

As yet another example, the security engine 402 determines whether the API call 410 includes a large amount of data, e.g., an amount of data greater than a pre-determined threshold, to determine whether the API call 410 is valid. To illustrate, the security engine 402 determines that the API call 410 includes the amount of data greater than the pre-determined threshold to determine that the API call 410 is invalid. In the illustration, on the other hand, upon determining that the API call 410 includes the amount of data less than the pre-determined threshold, the security engine 402 determines that the API call 410 is valid. In the example, by determining whether the API call 410 includes the large amount of data, the security engine 402 avoids a distributed denial-of-service (DDoS) attack from the modification microservice n. In the example, the security engine 402 determines that the modification microservice n includes a malicious code upon determining that the API call 410 includes the large amount of data.

Upon determining that the API call 410 is invalid, the security engine 402 denies the API call 410. For example, the security engine 402 does not provide the API call 410 to the API processor 404. Moreover, the security engine 402 blocks any further API calls received from the modification microservice n to be sent to the API processor 404. The further API calls are received by the security engine 402 after the API call 410 is received and are received during execution of the modification microservice n. The modification microservice n is executed by the one or more processors of the cloud system 304 (FIG. 3A) or by the one or more processors of the isolated server system 352 (FIG. 3B).

On the other hand, upon determining that the API call 410 is valid, the security engine 402 sends an indication of the validation to the game processes 309. Also, upon determining that the API call 410 is valid, the security engine 402 sends the indication of the validation of the API call 410 to the API processor 404 and forwards the API call 410 to the API processor 404. Upon receiving, the indication of the validation of the API call 410 and the API call 410, the API processor 404 accesses the microservices map 406 from the one or more memory devices of the game cloud system 302 and adds an indication to the microservices map 406 of execution of the modification microservice n simultaneously with the execution of the game processes 309. The API processor 404 constantly updates the microservices map 406 to add or remove a connection between a microservice, such as any of the microservices 1 through 10 and the modification microservice n, and the game processes 309 based on whether the microservice is being executed simultaneously with the execution of the game processes 309.

Upon adding the modification microservice n to the microservices map 406 and after receiving the indication of the validation of the API call 410, the API processor 404 sends an instruction to the microservices connection manager 408 to enable communication, such as exchange of data, e.g., state data or lighting data or frame information, between the modification microservice n and the game instance 304. The instruction sent from the API processor 404 to the microservices connection manager 408 is an example of an indication of the validation of the API call 410. Also, the instruction sent from the API processor 404 to the microservices connection manager 408 includes the API call 410 and one or more network addresses of one or more servers that execute the modification microservice n.

Upon receiving the instruction from the API processor 404, the microservices connection manager 408 enables, such as allows, the exchange of data between the modification microservice n and the game instance 304. For example, the game engine 312 is executed to apply lighting to a frame. In the example, the modification microservice n is to add additional or extra lighting to the frame. In the example, once the game engine 312 has finished applying the lighting to the frame, the game engine 312 provides an indication to the microservices connection manager 408 that the game engine 312 is finished applying the lighting to the frame and that the modification microservice n is to now generate data to apply the additional lighting to the frame. In the example, upon receiving the indication, the microservices connection manager 408 sends the indication to the modification microservice n at the one or more network locations of the modification microservice n. Also, in the example, upon receiving the indication, the microservices connection manager 408 sends to the modification microservice n, the one or more network addresses of the one or more servers of the game cloud system 302 from which the indication is received. In the example, the modification microservice n receives the indication and the one or more network addresses of the one or more servers of the game cloud system 302, and generates an additional API call including the data for applying the additional lighting to the frame, and sends the additional API call for applying the additional lighting to the one or more network addresses of the game cloud system 302. In the example, the additional API call is processed by the mod interface 306 in the same manner in which the API call 410 is processed before providing the API call 410 to the game instance 304. In the example, the additional API call is an example of one of the further API calls received from the modification microservice n after receiving the API call 410.

In this manner, the microservices connection manager 408 connects the game processes 309 to one or more of the microservices 1 through n and disconnects the one or more of the microservices 1 through n from the game processes 309. For example, when a first virtual scene is to include the flow of the virtual river in the directions 110 and 206 (FIGS. 1 and 2), the microservices connection manager 408 connects the game processes 309 to the modification microservice n in addition to or instead of one or more of the microservices 1 through 10 to form a game instance other than the game instance 304. In the example, when a second virtual scene is to include the flow of the virtual river in the direction 110 without the direction 206, the microservices connection manager 408 disconnects the modification microservice n from game processes 309 to form the game instance 304. In the example, the second virtual scene is displayed on the display device 102 (FIG. 1) after the first virtual scene is displayed.

In one embodiment, an isolated VM is used instead of the isolated server system 352 and a VM is used instead of the server system 354. The isolated VM provides the same protection to the game instance 304 from the malicious code when present in the modification microservice n as that provided by the isolated server system 352. The isolated VM executes the modification microservice n and the VM executes the mod interface 306.

In one embodiment, the modification microservice n can connect to arbitrary network addresses, which are not provided by the microservices connection manager 408 to the modification microservice n. The arbitrary network addresses can include network locations of one or more servers of the game cloud system 302. To reduce chances of the modification microservice n to connect to the arbitrary network addresses, the microservices connection manager 408 implements network-level methods, such as firewall methods. An example of the firewall methods includes the method described above for avoiding the DDoS attack. As another example, the microservices connection manager 408 provides credentials, such as one or more authentication tokens, to the modification microservice n after the modification microservice n is validated. When an API call is received from another microservice that is not the modification microservice n, the microservices connection manager 408 determines whether the API call is accompanied by one of the authentication tokens and upon determining so, the microservices connection manager 408 allows communication between the other microservice and the game instance 304. On the other hand, upon determining that the API call is unaccompanied by one of the authentication tokens, the microservices connection manager 408 does not allow the communication to reject the API call.

In an embodiment, functions, described herein, as being performed by the microservices connection manager 408 are performed by the security engine 402. In the embodiment, the microservices connection manager 408 is embedded within the security engine 402 and the API processor 404 is coupled to the game processes 309.

FIG. 5A is a diagram of an embodiment of a system 500 to illustrate that the modification microservice n cannot make the API call 410 or the further API calls to the game engine 312 or the game logic 310 to modify a code, such as a computer program, of the game engine 312 or the game logic 310. The system 500 includes the game engine 312, the game logic 310, and the modification microservice n.

Upon receiving the API call 410 from the modification microservice n, the security engine 402 (FIG. 4) determines whether the API call 410 includes the same functionality as that provided by a portion of the code of the game engine 312 or the game logic 310. For example, the security engine 402 parses the API call 410 to identify whether the API call 410 is to provide the flow of the virtual river in the direction 110 (FIG. 1). In the example, upon determining that the API call 410 provides the flow of the virtual river in the direction 110 and also the game logic 310 provides the flow in the direction 110, the security engine 402 determines that the API call 410 includes the same functionality. On the other hand, upon determining that the API call 410 provides the flow of the virtual river in the direction 206 (FIG. 2), and that the direction 206 is different from the direction 110, the security engine 402 determines that the API call 410 includes a different functionality.

Upon determining that the API call 410 includes the same functionality, the security engine 402 determines that the modification microservice n is pretending to be the game logic 310 to modify the code of the game logic 310, and does not provide the API call 410 and the further API calls from the modification microservice n for further processing to the API processor 404 (FIG. 4). On the other hand, in response to determining that the API call 410 includes the different functionality, the security engine 402 determines that the modification microservice n is not pretending to be the game logic 310 and sends the API call 410 for further processing to the API processor 404.

It should be noted that before the API call 410 is validated by the security engine 402, one or more network locations at which the game engine 312 and the game logic 310 are stored and executed are not provided from the mod interface 306 (FIG. 3) to the modification microservice n. In this manner, the one or more network locations, such as one or more memory addresses of the one or more memory devices of the game cloud system 302, at which the game engine 312 and the game logic 310 are stored are hidden from the modification microservice n before the API call 410 is validated.

FIG. 5B is a diagram of an embodiment of a system 510 to illustrate that the game logic 310 and the game engine 312 are obfuscated from the modification microservice n. For example, the security engine 402 (FIG. 4) receives within the API call 410 (FIG. 4) or within the further API calls, a request from the modification microservice n to access, such as read, the code of the game logic 310 or the code of the game engine 312 or write to the code. The code of the game logic 310 and the code of the game engine 312 are stored at the one or more memory addresses of the one or more memory devices of the game cloud system 302. The security engine 402 denies the request to overlay a black box on the code of the game logic 310 and the game engine 312. By denying the request, one or more memory addresses of the one or more memory devices of the game cloud system 302 at which the game processes 309 are stored are hidden from the modification microservice n.

FIG. 5C is a diagram of an embodiment of a system 520 to illustrate that results of a function performed by the modification microservice n are provided to the game logic 310 or the game engine 312 or both the game logic 310 and the game engine 312. The system 520 includes the game logic 310 or the game engine 312 and the modification microservice n.

After validating the API call 410 (FIG. 4) received from the modification microservice n, the game logic 310 generates and sends a request 522 to the modification microservice n to execute a function of the modification microservice n. An example of the function is an operation of the API engine of the modification microservice n. The function is to be executed to add the compute capability to the game logic 310. For example, the request 522 is sent via the computer network 308 (FIG. 3A) to the cloud system 304 (FIG. 3A). As another example, the request 522 is sent from the server system 354 (FIG. 3B) to the isolated server system 352 (FIG. 3B). The request 522 is an example of one of the further API calls. As yet another example, the request 522 is sent from the game logic 310 via the microservices connection manager 408 (FIG. 4) to the security engine 402 (FIG. 4). The security engine 402 stores contents of the request 522 within one or more memory devices of the security engine 402. For example, the security engine 402 stores information indicating that only results, such as data and not instructions or code, are to be received in response to the request 522. In the example, the information includes the function to be executed by the modification microservice n to generate the results.

The security engine 402 sends the request 522 to the modification microservice n. For example, the request 522 is sent from the game cloud system 302 (FIG. 3A) via the computer network 308 (FIG. 3A) to the cloud system 304 (FIG. 3A). As another example, the request 522 is sent from the server system 354 to the isolated server system 352 (FIG. 3B). The request 522 is an example of an API call.

Upon receiving the request 522, the modification microservice n processes the request 522 and executes the function indicated in the request 522. The modification microservice n executes the function to generate a result 524 and provides the result 524 in the form of one of the further API calls to the game logic 310. For example, the result 524 provides is sent via the computer network 308 (FIG. 3A) to the game cloud system 302 (FIG. 4). As another example, the result 524 is sent from the isolated server system 352 (FIG. 3B) to the server system 354 (FIG. 3B).

The result 524 is processed in a similar manner, such as the same manner, in which the API call 410 (FIG. 3B) is processed by the mod interface 306 (FIG. 3B) to provide the result 524 to the game logic 310. For example, the security engine 402 determines whether the one of the further API calls includes information other than the result 524. To illustrate, the security engine 402 determines whether the result 524 is of a type that can generated as by executing the function indicated in the request 522. To further illustrate, the security engine 402 determines whether the result 524 includes information regarding the flow of the virtual water in the direction 206 (FIG. 2) and the function indicated in the request 522 is also to provide an additional flow of virtual water. In the further illustration, upon determining that the result 524 includes information regarding the flow of the virtual water in the direction 206 and the function indicated in the request 522 is also to provide the additional flow of virtual water, the security engine 402 determines that the result 524 is of the type that can be generated by executing the function in the request 522 to determine that the result 524 is valid. When the result 524 is valid, the result 524 is provided to the game logic 310 via the API processor 404 and the microservices connection manager 408 (FIG. 4). On the other hand, upon determining that the result 524 does not include information regarding the flow of the virtual water in the direction 206 or includes additional information with the information regarding the flow of the virtual water in the direction 206, and the function indicated in the request 522 is to provide the additional flow of virtual water, the security engine 402 determines that the result 524 is not of the type that can be generated by executing the function in the request 522. Upon determining that the result 524 is not of the type that can be generated by executing the function in the request 522, the security engine 402 determines that the result 524 is invalid.

As an example, the additional information included in the result 524 is data that is not requested within the request 522. To illustrate, the security engine 402 determines whether the additional information is greater than the predetermined threshold, and upon determining so, determines that the result 524 is invalid. On the other hand, upon determining that the additional information is less than the predetermined threshold, the security engine 402 determines that the result 524 is valid. As another illustration, the security engine 402 determines whether there is any additional information within the result 524, and upon determining so, determines that the result 524 is invalid. On the other hand, upon determining that there is no additional information in the result 524 and the result 524 includes only the information requested in the request 522, the security engine 402 determines that the result 524 is valid.

When the result 524 is invalid, the result 524 is not provided to the game logic 310. For example, the security engine 402 discards, such as deletes, the result 524 from one or more memory devices of the security engine 402.

Similarly, after validating the API call 410 received from the modification microservice n, the game engine 312 generates and sends a request 526 to the modification microservice n to execute the function of the modification microservice n. An example of the function is an operation of the AI engine of the modification microservice n. The function is to be executed to add the compute capability to the game engine 312. For example, the request 526 is sent via the computer network 308 to the cloud system 304. As another example, the request 526 is sent from the server system 354 to the isolated server system 352. The request 526 is an example of one of the further API calls. As yet another example, the request 526 is sent from the game engine 312 via the microservices connection manager 408 to the security engine 402. In the example, the security engine 402 stores contents of the request 526 within one or more memory devices of the security engine 402. To illustrate, the security engine 402 stores information indicating that only results, such as data and not instructions or code, are to be received in response to the request 526. In the example, the information includes the function to be executed by the modification microservice n to generate the results.

The security engine 402 sends the request 526 to the modification microservice n. For example, the request 526 is sent from the game cloud system 302 via the computer network 308 to the cloud system 304. As another example, the request 526 is sent from the server system 354 to the isolated server system 352. The request 526 is an example of an API call.

Upon receiving the request 526, the modification microservice n processes the request 526 and executes the function indicated in the request 526. The modification microservice n executes the function to generate a result 528 and provides the result 528 in the form of one of the further API calls to the game engine 312. For example, the result 528 is sent via the computer network 308 to the game cloud system 302. As another example, the result 528 is sent from the isolated server system 352 to the server system 354.

The result 528 is processed in a similar manner, such as the same manner, in which the API call 410 (FIG. 3B) is processed by the mod interface 306 (FIG. 3B) to provide the result 528 to the game engine 312. For example, the security engine 402 determines whether the one of the further API calls includes information other than the result 528. To illustrate, the security engine 402 determines whether the result 528 is of a type that can generated by executing the function indicated in the request 526. To further illustrate, the security engine 402 determines whether the result 528 includes information regarding lighting of an image frame and the function indicated in the request 526 is also to provide lighting to the image frame. In the further illustration, upon determining that the result 528 includes information regarding lighting of the image frame and the function indicated in the request 526 is also to provide lighting to the image frame, the security engine 402 determines that the result 528 is of the type that can be generated by executing the function in the request 526 to further determine that the result 528 is valid. When the result 528 is valid, the result 528 is provided to the game engine 312 via the API processor 404 and the microservices connection manager 408. On the other hand, upon determining that the result 528 does not include information regarding lighting of the image frame and the function indicated in the request 526 is to provide lighting to the image frame, the security engine 402 determines that the result 528 is not of the type that can be generated by executing the function in the request 526 to further determine that the result is invalid. When the result 528 is invalid, the result 528 is not provided to the game engine 312. For example, the security engine 402 discards, such as deletes, the result 528 from the one or more memory devices of the security engine 402.

FIG. 5D is a diagram of an embodiment of a system 530 to illustrate a method for providing security to the game engine 312. The system 530 includes the game engine 312 and the modification microservice n. The method illustrated using the system 530 is executed by the security engine 402 (FIG. 4).

The game engine 312 generates information, such as data, for providing one or more graphical parameters, such as lighting, texture, intensity, and color, to an image frame y, where y is a positive integer. After the API call 410 is indicated as valid by the security engine 402, the game engine 312 determines that the modification microservice n is to execute a function to generate the graphical parameters of a frame (y+1) based on state information regarding the frame (y+1) and the graphical parameters of the frame y, and generates a request 532. The request 532 is an example of an API call. The request 532 includes information regarding the frame y. For example, the request 532 includes the graphical parameters of virtual objects in the frame y and also includes the state information, such as positions and orientations, of the virtual objects in the frame (y+1). The request 530 further includes an instruction that only the graphical parameters of the frame (y+1) are to be generated based on the state information of the frame (y+1) and the graphical parameters of the frame y.

The game engine 312 sends the request 532 to the modification microservice n via the microservices connection manager 408 (FIG. 4) and the security engine 402 to instigate the modification microservice n to execute the function for generating the graphical parameters of the frame (y+1). The function for generating the graphical parameters of the frame (y+1) adds the compute capability to the game engine 312. The security engine 402 stores contents of the request 532 within the one or more memory devices of the security engine 402. For example, the security engine 402 stores the instruction indicating that only results, such as the graphical parameters of the frame (y+1), are to be received in response to the request 532.

The security engine 402 sends the request 532 to the modification microservice n. For example, the request 532 is sent from the game cloud system 302 via the computer network 308 to the cloud system 304. As another example, the request 532 is sent from the server system 354 to the isolated server system 352.

Upon receiving the request 532, the modification microservice n processes the request 532 and executes the function indicated in the request 532. The modification microservice n executes a function to generate a result 534 and provides the result 534 in the form of one of the further API calls to the game engine 312.

The result 534 is processed in a similar manner, such as the same manner, in which the API call 410 (FIG. 3B) is processed by the mod interface 306 (FIG. 3B) to determine whether to provide the result 534 to the game engine 312. For example, the security engine 402 determines whether one of the further API calls includes information other than the result 534. To illustrate, the security engine 402 determines whether the result 534 is of a type, such as having the graphical parameters of the frame (y+1), that can be generated by executing the function indicated in the request 532. In the illustration, upon determining that the result 534 is of the type that can be generated indicated in the request 532, the security engine 402 determines that the result 534 is valid. When the result 534 is valid, the result 534 is provided to the game engine 312 via the API processor 404 and the microservices connection manager 408. The game engine 312 uses the result 534 to generate the image frame (y+1) from the graphical parameters of the image frame (y+1), and sends the image frame (y+1) via the computer network 308 to the display device 102 (FIG. 1) for display of the image frame (y+1).

On the other hand, upon determining that the result 534 is not of the type that can be generated by executing the function indicated in the request 532, the security engine 402 determines that the result 534 is invalid. When the result 534 is invalid, the result 534 is not provided to the game engine 312. For example, the security engine 402 discards, such as deletes, the result 534 from the one or more memory devices of the security engine 402. Moreover, when the result 534 is invalid, the security engine 402 informs the game engine 312 that no further requests are to be sent to the modification microservice n and blocks any of the further API calls received from the modification microservice n.

Figure 5E:
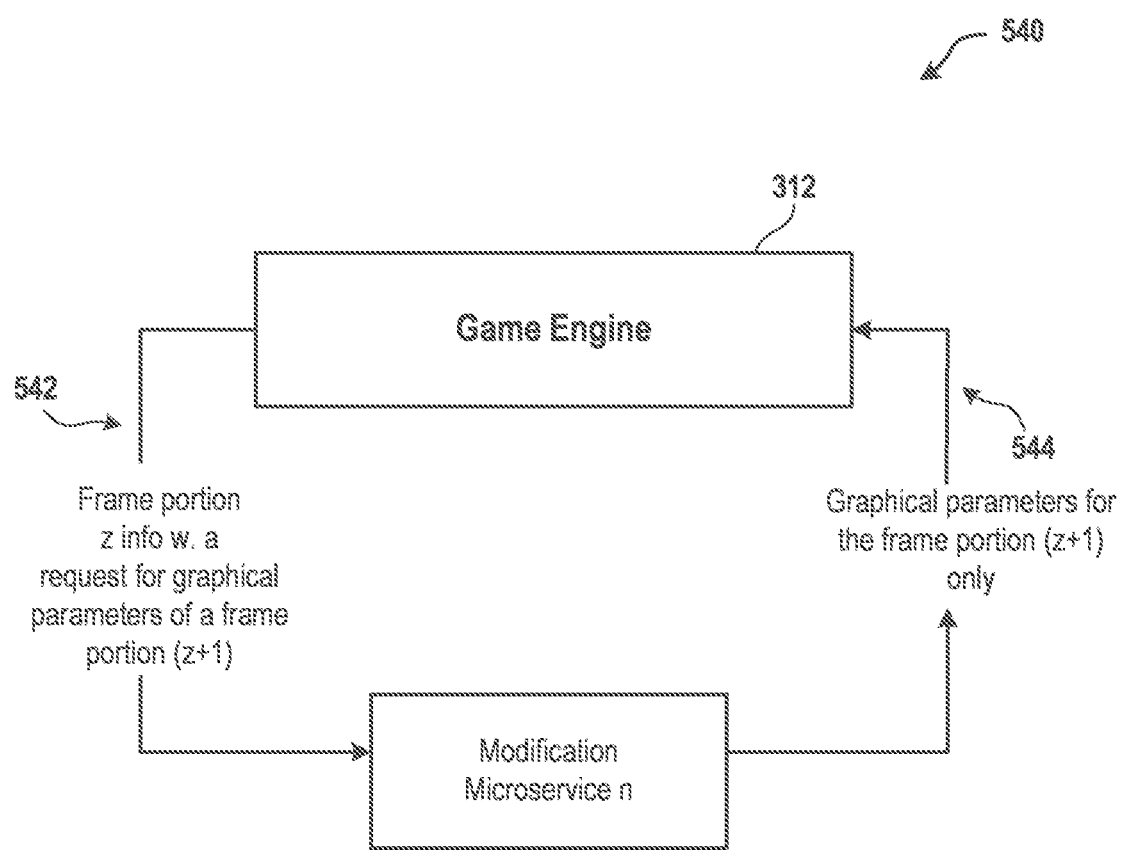
FIG. 5E is a diagram of an embodiment of a system to illustrate another method for providing security to the game engine.

FIG. 5E is a diagram of an embodiment of a system 540 to illustrate a method for providing security to the game engine 312. The system 540 includes the game engine 312 and the modification microservice n. The method illustrated using the system 540 is executed by the security engine 402 (FIG. 4).

The game engine 312 generates information, such as data, for providing one or more of the graphical parameters to an image frame portion z of the frame y, where z is a positive integer. After the API call 410 is indicated as valid by the security engine 402, the game engine 312 determines that the modification microservice n is to be executed to apply a function to generate the graphical parameters of an image frame portion (z+1) of the frame y based on state information regarding the image frame portion (z+1) and the graphical parameters of the image frame portion z, and generates a request 542. The request 542 is an example of an API call.

The request 542 includes information regarding the image frame portions z and (z+1). For example, the request 542 includes the graphical parameters of a virtual background in the image frame portion z and also includes the state information, such as positions and orientations, of virtual objects in the image frame portion (z+1). The request 542 further includes an instruction that only the graphical parameters of the image frame portion (z+1) are to be generated based on the state information of the image frame portion (z+1) and the graphical parameters of the image frame portion z.

The game engine 312 sends the request 542 to the modification microservice n via the microservices connection manager 408 (FIG. 4) and the security engine 402 to instigate the modification microservice n to execute the function for generating the graphical parameters of the image frame portion (z+1). The function for generating the graphical parameters of the image frame portion (z+1) adds the compute capability to the game engine 312. The security engine 402 stores contents of the request 542 within the one or more memory devices of the security engine 402. For example, the security engine 402 stores the instruction indicating that only results, such as the graphical parameters of the image frame portion (z+1), are to be received in response to the request 542.

The security engine 402 sends the request 542 to the modification microservice n. For example, the request 542 is sent from the game cloud system 302 via the computer network 308 to the cloud system 304. As another example, the request 542 is sent from the server system 354 to the isolated server system 352.

Upon receiving the request 542, the modification microservice n processes the request 542 and executes the function indicated in the request 542. The modification microservice n executes a function to generate a result 544 and provides the result 544 in the form of one of the further API calls to the game engine 312.

The result 544 is processed in a similar manner, such as the same manner, in which the API call 410 (FIG. 3B) is processed by the mod interface 306 (FIG. 3B) to determine whether to provide the result 544 to the game engine 312. For example, the security engine 402 determines whether one of the further API calls includes information other than the result 544. To illustrate, the security engine 402 determines whether the result 544 is of a type, such as having the graphical parameters of the image frame portion (z+1), that can be generated by executing the function indicated in the request 542. In the illustration, upon determining that the result 544 is of the type that can be generated indicated in the request 542, the security engine 402 determines that the result 544 is valid. When the result 544 is valid, the result 544 is provided to the game engine 312 via the API processor 404 and the microservices connection manager 408. The game engine 312 uses the result 544 to generate the image frame y from the graphical parameters of the image frame portions z and (z+1), and sends the image frame y via the computer network 308 to the display device 102 (FIG. 1) for display of the image frame y.

On the other hand, upon determining that the result 544 is not of the type that can be generated by executing the function indicated in the request 542, the security engine 402 determines that the result 544 is invalid. When the result 544 is invalid, the result 544 is not provided to the game engine 312. For example, the security engine 402 discards, such as deletes, the result 544 from the one or more memory devices of the security engine 402. Moreover, when the result 544 is invalid, the security engine 402 informs the game engine 312 that no further requests are to be sent to the modification microservice n and blocks any of the further API calls received from the modification microservice n.

In one embodiment, not all API calls received by the security engine 402 from the modification microservice n are processed by the security engine 402 to validate the API calls. Rather, the security engine 402 validates one or more of the API calls received by the security engine 402 from the modification microservice n. For example, after validating the API call 410, any of the further API calls received from the modification microservice n are not validated by the security engine 402. In the example, the game instance 304 is connected to the modification microservice n. As another example, after validating the API call 410, one or more of the further API calls received from the modification microservice n are not validated by the security engine 402 for a predetermined period of time from the receipt of the API call 410 by the security engine 402. After passage of the predetermined period of time, the security engine 402 validates one of the further API calls received by the security engine 402 after the predetermined period of time. In the example, the security engine 402 includes a timer for determining whether the predetermined period of time has passed. As yet another example, after validating the API call 410, one or more of the further API calls received from the modification microservice n are not validated by the security engine 402 until a predetermined number of API calls from the receipt of the API call 410 by the security engine 402 have been received from the modification microservice n. After the predetermined number of API calls are received, the security engine 402 validates one or more of the further API calls received by the security engine 402. In the example, the security engine 402 includes a counter for determining whether the predetermined number of API calls is received.

Figure 6:
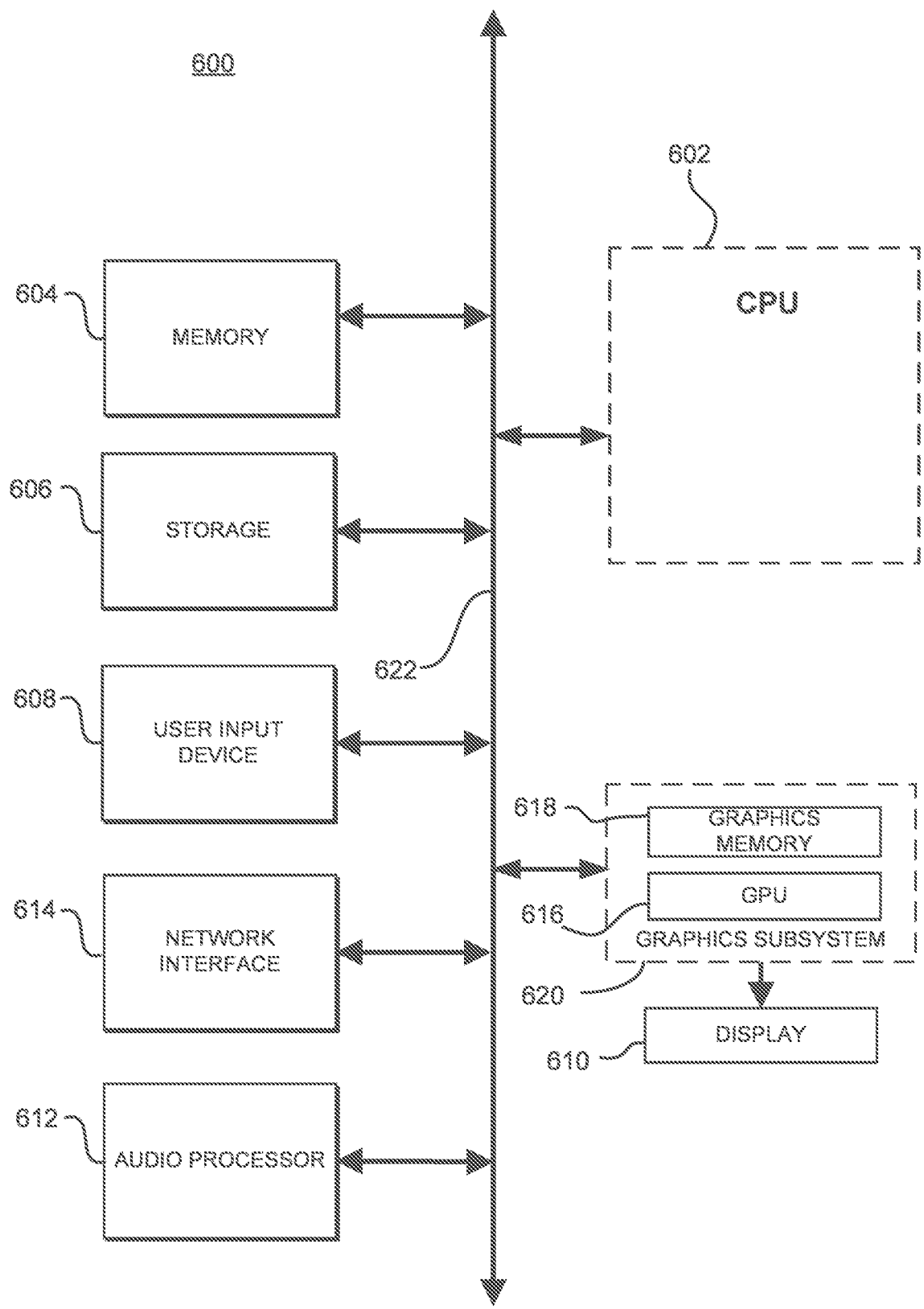
FIG. 6 illustrates components of an example device that can be used to perform aspects of the various embodiments of the present disclosure.

FIG. 6 illustrates components of an example device 600 that can be used to perform aspects of the various embodiments of the present disclosure. This block diagram illustrates the device 600 that can incorporate or can be a personal computer, video game console, personal digital assistant, a server or other digital device, suitable for practicing an embodiment of the disclosure. The device 600 includes a CPU 602 for running software applications and optionally an operating system. The CPU 602 includes one or more homogeneous or heterogeneous processing cores. For example, the CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. The device 600 can be a localized to a player playing a game segment (e.g., game console), or remote from the player (e.g., back-end server processor), or one of many servers using virtualization in a game cloud system for remote streaming of gameplay to clients.

A memory 604 stores applications and data for use by the CPU 602. A storage 606 provides non-volatile storage and other computer readable media for applications and data and may include fixed disk drives, removable disk drives, flash memory devices, compact disc-ROM (CD-ROM), digital versatile disc-ROM (DVD-ROM), Blu-ray, high definition-DVD (HD-DVD), or other optical storage devices, as well as signal transmission and storage media. User input devices 608 communicate user inputs from one or more users to the device 600. Examples of the user input devices 608 include keyboards, mouse, joysticks, touch pads, touch screens, still or video recorders/cameras, tracking devices for recognizing gestures, and/or microphones. A network interface 614 allows the device 600 to communicate with other computer systems via an electronic communications network, and may include wired or wireless communication over local area networks and wide area networks, such as the internet. An audio processor 612 is adapted to generate analog or digital audio output from instructions and/or data provided by the CPU 602, the memory 604, and/or data storage 606. The components of device 600, including the CPU 602, the memory 604, the data storage 606, the user input devices 608, the network interface 614, and an audio processor 612 are connected via a data bus 622.

A graphics subsystem 620 is further connected with the data bus 622 and the components of the device 600. The graphics subsystem 620 includes a graphics processing unit (GPU) 616 and a graphics memory 618. The graphics memory 618 includes a display memory (e.g., a frame buffer) used for storing pixel data for each pixel of an output image. The graphics memory 618 can be integrated in the same device as the GPU 616, connected as a separate device with the GPU 616, and/or implemented within the memory 604. Pixel data can be provided to the graphics memory 618 directly from the CPU 602. Alternatively, the CPU 602 provides the GPU 616 with data and/or instructions defining the desired output images, from which the GPU 616 generates the pixel data of one or more output images. The data and/or instructions defining the desired output images can be stored in the memory 604 and/or the graphics memory 618. In an embodiment, the GPU 616 includes three-dimensional (3D) rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 614 periodically outputs pixel data for an image from the graphics memory 618 to be displayed on the display device 610. The display device 610 can be any device capable of displaying visual information in response to a signal from the device 600, including a cathode ray tube (CRT) display, a liquid crystal display (LCD), a plasma display, and an organic light emitting diode (OLED) display. The device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a GPU since it will be doing a large number of relatively simple mathematical operations (e.g., matrix transformations). Other game engine segments that require fewer but more complex operations may be provisioned with a processing entity associated with one or more higher power CPUs.

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and an input/output (I/O) interface. The client device can be a personal computer (PC), a mobile phone, a netbook, a personal digital assistant (PDA), etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device system, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In an embodiment, although the embodiments described herein apply to one or more games, the embodiments apply equally as well to multimedia contexts of one or more interactive spaces, such as a metaverse.

In one embodiment, the various technical examples can be implemented using a virtual environment via the HMD. The HMD can also be referred to as a virtual reality (VR) headset. As used herein, the term "virtual reality" (VR) generally refers to user interaction with a virtual space/environment that involves viewing the virtual space through the HMD (or a VR headset) in a manner that is responsive in real-time to the movements of the HMD (as controlled by the user) to provide the sensation to the user of being in the virtual space or the metaverse. For example, the user may see a three-dimensional (3D) view of the virtual space when facing in a given direction, and when the user turns to a side and thereby turns the HMD likewise, the view to that side in the virtual space is rendered on the HMD. The HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on the HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, compact disc-read only memories (CD-ROMs), CD-recordables (CD-Rs), CD-rewritables (CD-RWs), magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

It should be noted that in various embodiments, one or more features of some embodiments described herein are combined with one or more features of one or more of remaining embodiments described herein.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for implementing a modification microservice with a game cloud system, comprising:
executing, by the game cloud system, a game instance of a game, wherein the game instance is executed using a plurality of microservices assembled for the game instance;
receiving an application programming interface (API) call from the modification microservice;
modifying a microservices map based on the API call;
enabling communication between the game instance and the modification microservice upon determining that the API call is valid; and
accessing the modification microservice engineered to be executed with the game instance, wherein the modification microservice is configured to add a compute capability to the game instance, wherein the modification microservice is configured to be executed outside of a server system in which the plurality of microservices is assembled for the game instance, wherein the modification microservice is configured to be accessed by the API call that obtains results data from said execution of the modification microservice,
wherein the API call is managed via a modification interface that manages said accessing of the modification microservice and use of the results data by said game instance.

2. The method of claim 1, further comprising:
receiving a second API call from the modification microservice;
determining whether the second API call is valid; and
denying the second API call upon determining that the second API call is invalid.

3. The method of claim 2, wherein said denying the second API call includes not providing the second API call to the game instance.

4. The method of claim 1, wherein the modification microservice cannot be integrated into the game instance.

5. The method of claim 1, wherein the game instance includes a game logic and a game engine, the method further comprising obfuscating the game logic and the game engine from the modification microservice.

6. The method of claim 1, further comprising:
determining whether a response to the API call includes data other than the results data; and
denying the response upon determining that the API call includes the data other than the results data.

7. The method of claim 1, further comprising:
determining whether a response to the API call includes data other than the results data; and
allowing the response upon determining that the API call does not include the data other than the results data.

8. The method of claim 1, wherein the modification microservice is configured to be stored in a cloud system that is coupled to the game cloud system via a computer network to be executed outside of the server system.

9. The method of claim 1, wherein the modification microservice is configured to be stored in an isolated server system within the game cloud system to be executed outside of the server system, wherein the game instance is configured to be stored in the server system of the game cloud system.

10. The method of claim 1, wherein the compute capability includes implementing an artificial intelligence (AI) model to be trained based on gameplay of the game by a user.

11. The method of claim 1, wherein the game instance includes an instance of execution of a game engine, an instance of execution of a game code, and one or more instances of execution of one or more of the plurality of microservices.

12. A system for implementing a modification microservice with a game cloud system, comprising:
the game cloud system configured to execute a game instance of a game, wherein the game instance is executed using a plurality of microservices assembled for the game instance, wherein the modification microservice includes:
a security engine;
an API processor coupled to the security engine; and
a microservices connection manager coupled to the API processor,
wherein the security engine is configured to:
receive an API call from the modification microservice;
wherein the API processor is configured to modify a microservices map based on the API call,
wherein the microservices connection manager is configured to enable communication between the game instance and the modification microservice upon determining that that the API call is valid; and
the modification microservice, wherein the game cloud system is configured to access the modification microservice engineered to be executed with the game instance, wherein the modification microservice is configured to add a compute capability to the game instance, wherein the modification microservice is configured to be executed outside of a server system in which the plurality of microservices is assembled for the game instance, wherein the modification microservice is configured to be accessed by the API call to obtain results data, wherein the results data is generated when the modification microservice is executed,
wherein the game cloud system includes a modification interface configured to manage the access to the modification microservice and use of the results data by the game instance.

13. The system of claim 12, wherein the modification microservice includes a security engine configured to:
receive a second API call from the modification microservice;
determine whether the second API call is valid; and
deny the second API call upon determining that the second API call is invalid.

14. The system of claim 13, wherein to deny the second API call, the security engine is configured to not provide the second API call to the game instance.

15. The system of claim 12, wherein the modification microservice cannot be integrated into the game instance.

16. The system of claim 12, wherein the game instance includes a game logic and a game engine, the system further comprising obfuscating the game logic and the game engine from the modification microservice.

17. A non-transitory computer-readable medium containing program instructions for implementing a modification microservice with a game cloud system, wherein execution of the program instructions by one or more processors of a computer system causes the one or more processors to carry out operations of:
> executing, by the game cloud system, a game instance of a game, wherein the game instance is executed using a plurality of microservices assembled for the game instance;
> receiving an application programming interface (API) call from the modification microservice;
> modifying a microservices map based on the API call;
> enabling communication between the game instance and the modification microservice upon determining that the API call is valid; and
> accessing the modification microservice engineered to be executed with the game instance, wherein the modification microservice is configured to add a compute capability to the game instance, wherein the modification microservice is configured to be executed outside of a server system in which the plurality of microservices is assembled for the game instance, wherein the modification microservice is configured to be accessed by the API call that obtain results data from said execution of the modification microservice,
> wherein the API call is managed via a modification interface that manages said accessing of the modification microservice and use of the results data by said game instance.

18. The non-transitory computer-readable medium of claim 17, wherein the operations comprise:
> receiving a second API call from the modification microservice;
> determining whether the second API call is valid; and
> denying the second API call upon determining that the second API call is invalid.

* * * * *